(12) United States Patent
Uehara et al.

(10) Patent No.: US 11,098,937 B2
(45) Date of Patent: Aug. 24, 2021

(54) REFRIGERATOR

(71) Applicant: DAIKIN INDUSTRIES, LTD., Osaka (JP)

(72) Inventors: Yoshikazu Uehara, Osaka (JP); Kazuhide Mizutani, Osaka (JP); Norio Iga, Osaka (JP); Makoto Ikemiya, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 147 days.

(21) Appl. No.: 16/475,278

(22) PCT Filed: Feb. 9, 2018

(86) PCT No.: PCT/JP2018/004681
§ 371 (c)(1),
(2) Date: Jul. 1, 2019

(87) PCT Pub. No.: WO2018/147428
PCT Pub. Date: Aug. 16, 2018

(65) Prior Publication Data
US 2019/0331378 A1 Oct. 31, 2019

(30) Foreign Application Priority Data
Feb. 9, 2017 (JP) .............................. JP2017-022210

(51) Int. Cl.
*F25B 49/02* (2006.01)
*F25D 11/00* (2006.01)
(Continued)

(52) U.S. Cl.
CPC ............ *F25B 49/02* (2013.01); *F25D 11/003* (2013.01); *F25B 2500/222* (2013.01);
(Continued)

(58) Field of Classification Search
CPC .... F25B 2500/222; F25B 49/02; F25D 11/03; F25D 17/06; F25D 2317/068; F25D 2317/0682; B60H 1/00378
See application file for complete search history.

(56) References Cited

U.S. PATENT DOCUMENTS

2002/0023454 A1 2/2002 Watanabe et al.
2006/0042275 A1 3/2006 Tanaka
(Continued)

FOREIGN PATENT DOCUMENTS

JP 2000-146404 A 5/2000
JP 2002-107032 A 4/2002
(Continued)

*Primary Examiner* — Marc E Norman
(74) *Attorney, Agent, or Firm* — Birch, Stewart, Kolasch & Birch, LLP

(57) ABSTRACT

To facilitate replacement or repair of a sensor for refrigerant leakage detection used for a refrigerator for a storage box such as a container in case of breakdown, a sensor for refrigerant leakage detection is disposed outside of an internal space of a storage box, and an internal air guide passage is provided which guides internal air from a discharge side of a fan provided in the internal space of the storage box to the sensor for refrigerant leakage detection.

15 Claims, 10 Drawing Sheets

(51) Int. Cl.
*F25D 11/02* (2006.01)
*F25D 17/06* (2006.01)

(52) U.S. Cl.
CPC ............ *F25D 11/022* (2013.01); *F25D 17/06* (2013.01); *F25D 2317/0682* (2013.01)

(56) References Cited

U.S. PATENT DOCUMENTS

| | | |
|---|---|---|
| 2009/0071176 A1 | 3/2009 | Tanaka |
| 2009/0077986 A1 | 3/2009 | Tanaka |
| 2018/0327179 A1* | 11/2018 | Papas .................... F25D 11/003 |
| 2018/0347896 A1* | 12/2018 | Eddy ..................... F25D 11/003 |

FOREIGN PATENT DOCUMENTS

| | | |
|---|---|---|
| JP | 2003-178361 A | 6/2003 |
| JP | 2004-325022 A | 11/2004 |
| JP | 2009-92326 A | 4/2009 |
| JP | 2009-93467 A | 4/2009 |
| JP | 2009-93468 A | 4/2009 |
| JP | 2014-52136 A | 3/2014 |

* cited by examiner

REFRIGERATOR

TECHNICAL FIELD

The present disclosure relates to a refrigerator, and more particularly to a refrigerator equipped with a sensor for refrigerant leakage detection detecting refrigerant leakage in a refrigerant circuit.

BACKGROUND ART

Conventionally, there have been known refrigeration containers used for, for example, marine transportation. The refrigeration containers are provided with a container refrigerator cooling an internal space of a container main body which is a storage box.

Patent Document 1 discloses a container refrigerator. The container refrigerator of this kind is mounted on a front open part of the container main body. The container refrigerator includes a frame, below which a storage space facing to the outside is formed and referred to as an external storage space. In this external storage space, there are disposed a compressor, a condenser, an internal fan, etc. A storage space facing the inside of the container main body is formed above the frame and referred to as an internal storage space. In this internal storage space, there are provided an evaporator and an internal fan. This container refrigerator includes a refrigerant circuit. In the refrigerant circuit, the compressor, the condenser and the evaporator are connected by a refrigerant pipe. A refrigeration cycle is carried out through circulation of refrigerant in the refrigerant circuit. The evaporator cools internal air in the container main body.

In case where combustible refrigerant is used for the refrigerant circuit, the sensor for refrigerant leakage detection may be disposed on a door of the container main body so that refrigerant leakage into the container main body can be detected. In this configuration, in case of refrigerant leakage into the container main body, the door of the container main body may be kept from opening by using a signal from the sensor for refrigerant leakage detection.

CITATION LIST

Patent Document

Patent Document 1: Japanese Unexamined Patent Publication No. 2004-325022

SUMMARY OF THE INVENTION

Technical Problem

The temperature inside the container main body used for marine transportation varies depending on cargoes to be transported. The temperature is generally set in the range of −40° C. to 30° C. This range is considered to be wide. On the contrary, the sensor for refrigerant leakage detection provided in the internal space of the container main body generally cannot be used in case of low temperature. Even if the heating up through using a heater in case of low temperature is carried out, there is a fear that the sensor may break down due to dew condensation.

With the configuration in which the sensor for refrigerant leakage detection is disposed in the internal space of the container main body, workers cannot enter the inside of the container main body during transportation of cargoes. Accordingly, in case of breakdown, the sensor for refrigerant leakage detection can neither be replaced nor repaired. As a result, the following drawback has been known in conventional cases: In case of breakdown of the sensor for refrigerant leakage detection, cargoes had to be transported while the situation inside the container main body remained unclear. Accordingly, it is necessary to take a measure to prevent the combustible refrigerant from leaking out from the internal space of the container main body to the outside at the time of unloading cargos irrespective of the existence of refrigerant leakage.

The above drawback is not limited to container refrigerators used for marine transportation but is also common in container refrigerators used for land transportation. Further, this drawback is also found in container refrigerators cooling the inside of storage boxes storing various goods while the temperature or the humidity is adjusted. (Note that the storage boxes here not only mean containers but also land-based warehouses.)

The present disclosure has been made in view of the above drawback, and it is an object of the present disclosure to allow a sensor for refrigerant leakage detection used in a refrigerator cooling storage boxes to be easily replaced or repaired in case of breakdown, and to substantially eliminate an unnecessary measure to prevent refrigerant leakage at the time of unloading the goods from the storage boxes.

Solution to the Problem

A first aspect of the present disclosure is assumed to be a refrigerator including a casing (12) mounted to a storage box (11), a refrigerant circuit (20) including an evaporator (24) cooling internal air in the storage box (11) and a condenser (22) disposed outside the storage box (11), and a sensor for refrigerant leakage detection (35) detecting a leakage of a refrigerant from the refrigerant circuit (20).

In this refrigerator, the sensor for refrigerant leakage detection (35) is disposed outside of an internal space (S2, S3) of the storage box (11). The refrigerator includes an internal air guide passage (36) which guides the internal air from a discharge side of a fan (26) disposed in the internal space (S2, S3) of the storage box (11) to the sensor for refrigerant leakage detection (35).

According to the first aspect, the internal air of the storage box (11) flows partially into the internal air guide passage (36). The internal air flowing into the internal air guide passage (36) passes through the sensor for refrigerant leakage detection (35), returning to the internal space (S2, S3) of the storage box (11). Since the internal air passes through the sensor for refrigerant leakage detection (35), refrigerant leakage is detected by the sensor for refrigerant leakage detection (35) in case where the refrigerant leaks out from the refrigerant circuit (20). In this configuration, the above sensor for refrigerant leakage detection (35) is disposed outside the internal space (S2, S3). As a result, the sensor for refrigerant leakage detection (35) is unlikely to be affected by the temperature in the internal space (S2, S3). Hence, the sensor for refrigerant leakage detection (35) is less subject to dew condensation even in case of low temperature in the internal space (S2, S3).

In a second aspect of the first aspect, the sensor for refrigerant leakage detection (35) is disposed at least partially outside of a storage box with respect to a thermal insulator (12c) disposed in the casing (12).

According to the second aspect, the sensor for refrigerant leakage detection (35) is disposed at least partially outside of the storage box with respect to the thermal insulator (12c) provided in the casing (12) so that the sensor for refrigerant leakage detection (35) is less likely to be affected by the temperature in the internal air.

According to the third aspect, the air-inlet side end (36a) of the internal air guide passage (36) is disposed on the discharge side of the fan (26) and the air-outlet side end (36b) of the internal air guide passage (36) is disposed at the intake side of the fan (26).

According to the third aspect, internal air flows from the intake side end (36a) disposed at the discharge side of the fan (26) into the internal air guide passage (36), and is guided to the sensor for refrigerant leakage detection (35). After refrigerant leakage is detected by the sensor for refrigerant leakage detection (35), the internal air returns from the air-outlet side end (36b) disposed at the intake side of the fan (26) into the inside of the storage box.

In a fourth aspect of the first to third aspects, the air-inlet side end (36a) of the internal air guide passage (36) is disposed downstream of airflow passing through the evaporator (24).

In a fifth aspect of the fourth aspect, the air-inlet side end (36a) of the internal air guide passage (36) is disposed below the evaporator (24).

According to the fourth and fifth aspects, the internal air after passing through the evaporator (24) is guided from the internal air guide passage (36) to the sensor for refrigerant leakage detection (35). Then, refrigerant leakage is detected by the sensor for refrigerant leakage detection (35).

In a sixth aspect of any one of the first to fifth aspects, a guide member (37) guiding air flowing in the internal space (S2, S3) of the storage box (11) into the internal air guide passage (36) is disposed close to the internal space (S2, S3) of the storage box (11).

According to the sixth aspect, air flowing through the internal space (S2, S3) is guided by the guide member (37) to flow into the internal air guide passage (36) and then guided to the sensor for refrigerant leakage detection (35).

In a seventh aspect of any one of the first to sixth aspects, the sensor for refrigerant leakage detection (35) is disposed downstream of airflow passing through the condenser (22).

According to this seventh aspect, the internal air is guided to the sensor for refrigerant leakage detection (35) so that the refrigerant leakage detection is carried out. At the same time, the external air heated after passing through the condenser (22) passes by the surroundings of the sensor for refrigerant leakage detection (35) so that the sensor for refrigerant leakage detection (35) is less subject to dew condensation.

In an eighth aspect of the first or second aspect, the sensor for refrigerant leakage detection (35) is disposed in a vicinity of an outlet of a ventilation port (11a) provided in the casing (12) of the storage box (11).

According to the eighth aspect, the internal air discharged from the ventilation port (11a) is guided to the sensor for refrigerant leakage detection (35). Then, refrigerant leakage is detected, using the internal air discharged.

In a ninth aspect of any one of the first to eight aspects, the storage box (11) is a container main body (11) used for transportation of a cargo, and the casing (12) is configured to be mounted to the container main body (11).

According to this ninth aspect, the sensor for refrigerant leakage detection (35) is less subject to dew condensation even in case of low temperature in the internal space (S2, S3) in the container refrigerator.

Advantages of the Invention

According to the aspects of this disclosure, the sensor for refrigerant leakage detection (35) is disposed outside of the internal space (S2, S3). Therefore, refrigerant leakage can be detected without taking any measure such as heating up the sensor for refrigerant leakage detection (35) even in case of low temperature. Therefore, it is possible to prevent the dew condensation of the sensor for refrigerant leakage detection (35) and its breakdown.

According to the aspects of this disclosure, the sensor for refrigerant leakage detection (35) is disposed not inside the internal space (S2, S3), but outside the same. Therefore, the sensor for refrigerant leakage detection (35) may be replaced or repaired in case of breakdown. Conventionally, with the sensor for refrigerant leakage detection (35) broken down, cargoes have to be transported while the situation inside the storage box (11) is unclear, when the storage box is used as a container. As a result, at the time of unloading the cargos upon arrival, the measure to prevent the combustible refrigerant from flowing out from the internal space (S2, S3) of the storage box (11) of the container to the outside irrespective of the existence of refrigerant leakage. On the other hand, according to the aspects of this disclosure, the situation inside the storage box (11) can be clearly understood, eliminating substantially an unnecessary countermeasure to refrigerant leakage at the time of unloading the cargoes. Further, refrigerant leakage can be detected from outside also in case of land-based warehouses, facilitating the countermeasure to refrigerant leakage.

According to the second aspect, the sensor for refrigerant leakage detection (35) is disposed at least partially outside of the storage box with respect to the thermal insulator (12c) provided in the casing (12) so that the sensor for refrigerant leakage detection (35) is less likely to be affected by the temperature in the internal air and thus less likely to break down.

According to the third aspect, the air-inlet side end (36a) of the internal air guide passage (36) is disposed on the discharge side of the fan (26) and the air-outlet side end (36b) of the internal air guide passage (36) is disposed at the intake side of the fan (26) so that the internal air can be easily guided to the sensor for refrigerant leakage detection (35), resulting in enhancing the detection accuracy.

According to the fourth and the fifth aspects, internal air after passing through the evaporator (24) is guided from the internal air guide passage (36) to the sensor for refrigerant leakage detection (35). Accordingly, in case of refrigerant leakage from the evaporator (24), the detection accuracy of the sensor for refrigerant leakage detection (35) can be enhanced.

According to the sixth aspect, air flowing through the internal space (S2, S3) is guided into the internal air guide passage (36) by the guide member (37) and to the sensor for refrigerant leakage detection (35). As a result, the detection accuracy of the sensor for refrigerant leakage detection (35) can be enhanced.

According to the seventh aspect, external air heated after passing through the condenser (22) passes through the sensor for refrigerant leakage detection (35) so that the sensor for refrigerant leakage detection (35) is less subject to dew condensation. As a result, the sensor for refrigerant leakage detection (35) is less likely to break down, resulting in enhancing the detection accuracy of refrigerant leakage.

According to the eighth aspect, the sensor for refrigerant leakage detection (35) is disposed in the vicinity of the outlet of the ventilation port (11a) provided in the casing (12) of the storage box (11). As a result, the sensor for refrigerant leakage detection (35) can be easily mounted to the refrigerator.

According to the ninth aspect, the above effects can be obtained for the container refrigerator.

DESCRIPTION OF EMBODIMENTS

In the following, an embodiment will be described in detail with reference to the drawings. The following embodiment relates to a container refrigerator, which is one kind of refrigerators cooling the inside of a storage box. Note that the following description of the embodiment is merely an example in nature, and is not intended to limit the scope, applications, or use of the present disclosure.

Figure 1:
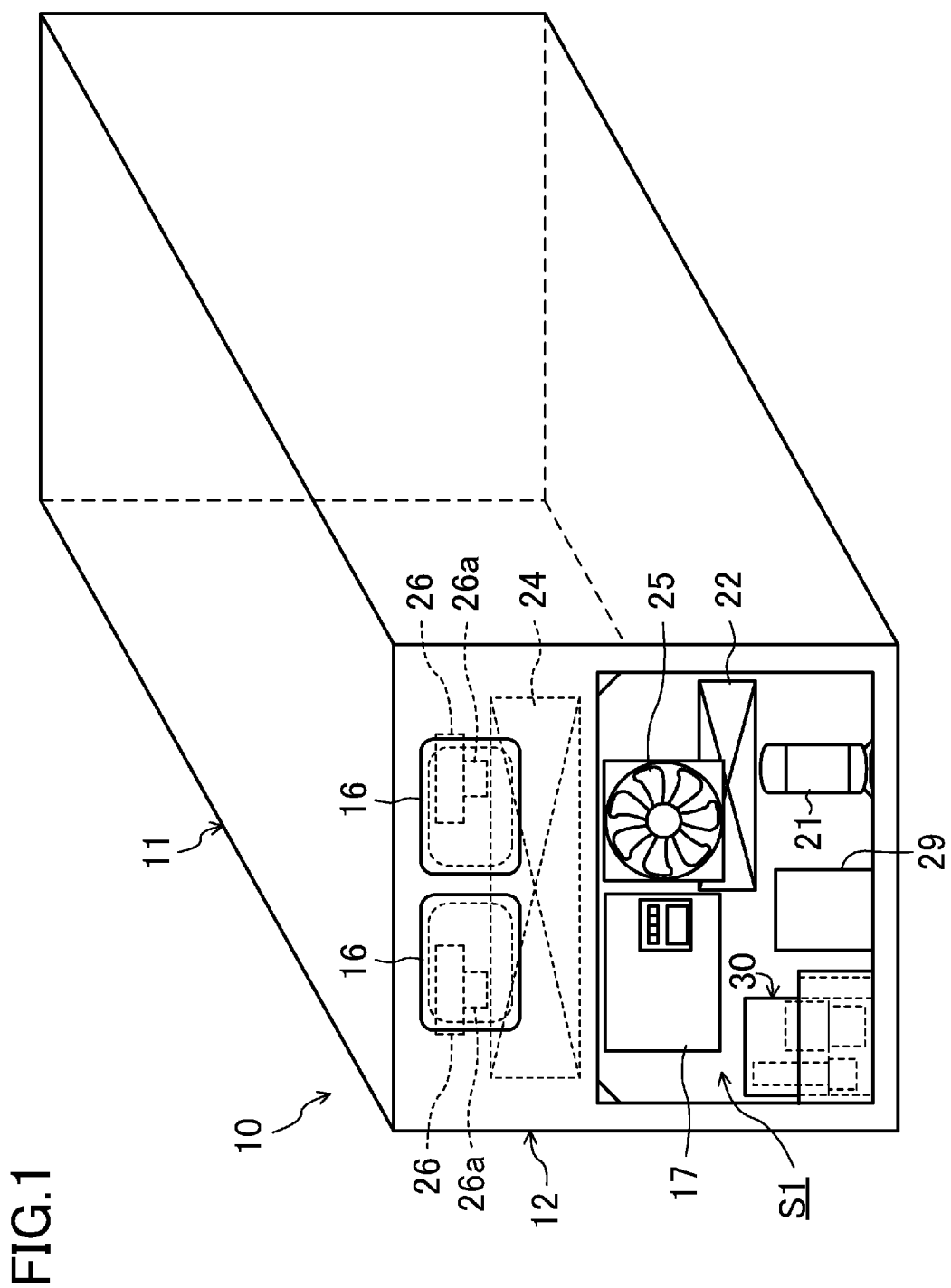
FIG. 1 is a perspective view illustrating a container refrigerator according to an embodiment as viewed from outside of the box.
Figure 2:
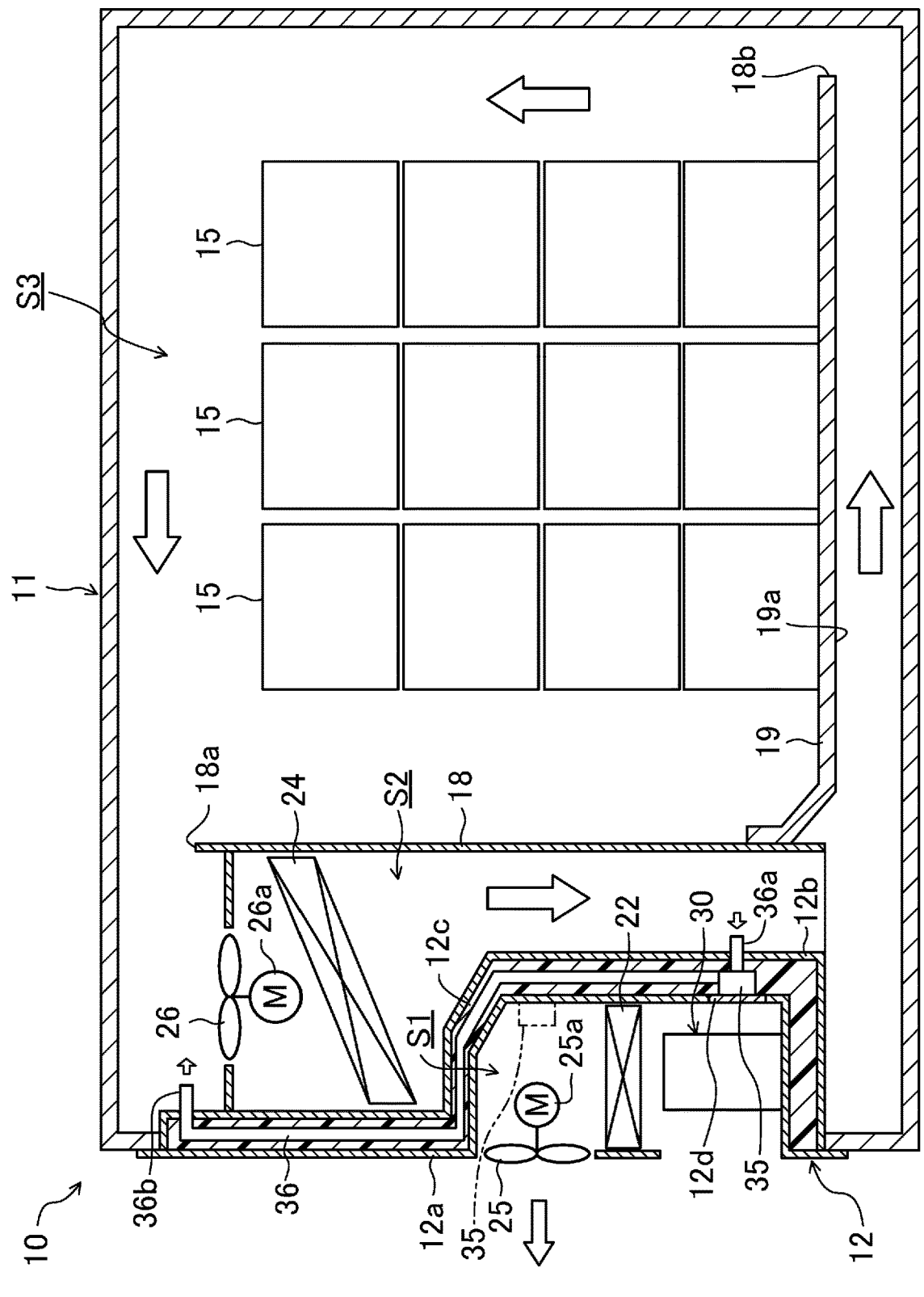
FIG. 2 is a lateral cross-sectional view illustrating a configuration of the container refrigerator.

A shown in FIG. 1 and FIG. 2, the container refrigerator (10) refrigerates a cargo storage space (S3) for a container main body (storage box) (11) used for marine transportation or land transportation. The container refrigerator (10) includes a refrigerant circuit (20) cooling air in an internal space (S2, S3) of the container main body (11) through using a refrigeration cycle (see FIG. 3). The internal space (S2, S3) includes a cargo storage space (S3) in which plants (15) such as grapes are boxed and stored, and an internal storage space (S2) in which a part of a refrigerant circuit described later is stored.

The container main body (11) is formed into a shape of a box with one side open. A casing (12) is mounted to and covers the opening end of the container main body. The casing (12) includes an exterior wall (12a) disposed outside the container main body (11), and an interior wall (12b) disposed inside the container main body (11). The exterior and interior walls (12a) and (12b) may be made of an aluminum alloy, for example.

The exterior wall (12a) is mounted to the periphery of the opening of the container main body (11) so as to close the end of the opening of the container main body (11). The exterior wall (12a) is formed such that the lower part of the exterior wall (12a) swells into the container main body (11).

The interior wall (12b) is disposed to face the exterior wall (12a). The interior wall (12b) swells into the container main body just like the lower part of the exterior wall (12a). A thermal insulator (12c) fills the space between the interior and exterior walls (12b, 12a).

The lower part of the casing (12) is formed so as to swell into the container main body (11). Thus, an external storage space (S1) is formed outside the container main body (11) and in the lower part of the casing (12), and the internal storage space (S2) is formed inside the container main body (11) and in the upper part of the casing (12).

The casing (12) is provided with two opening/closing doors (16) which are arranged side by side in a width direction and can open and close at the time of maintenance. The external storage space (S1) of the casing (12) includes an electric component box (17) adjacent to an external fan (25) described later.

A partition plate (18) is disposed between the internal spaces (S2, S3) of the container main body (11). This partition plate (18) is formed by a substantially rectangular plate member, and stands upright so as to face to the wall of the casing (12) facing the interior of the container main body (11). This partition plate (18) separates the internal storage space (S2) from the cargo storage space (S3) in the container main body (11).

An intake port (18a) is formed between the upper end of the partition plate (18) and a ceiling surface of the container main body (11). Air in the cargo storage space (S3) of the container main body (11) is taken into the internal storage space (S2) through the intake port (18a).

A floorboard (19) is disposed in the container main body (11) with a clearance interposed between the floorboard (19) and the bottom surface of the container main body (11). Boxed plants (15) are placed on the floorboard (19). An air flow path (19a) is formed between the floorboard (19) and the bottom surface of the container main body (11). The clearance left between the lower end of the partition plate (18) and the bottom surface of the container main body (11) communicates with the air flow path (19a).

An outlet (18b) is formed at the floorboard (19) facing the front of the container main body (11) (on the right side in FIG. 2). The outlet (18b) blows air treated in the container refrigerator (10) (that is, internal air cooled) into the cargo storage space (S3) of the container main body (11).

Figure 3:
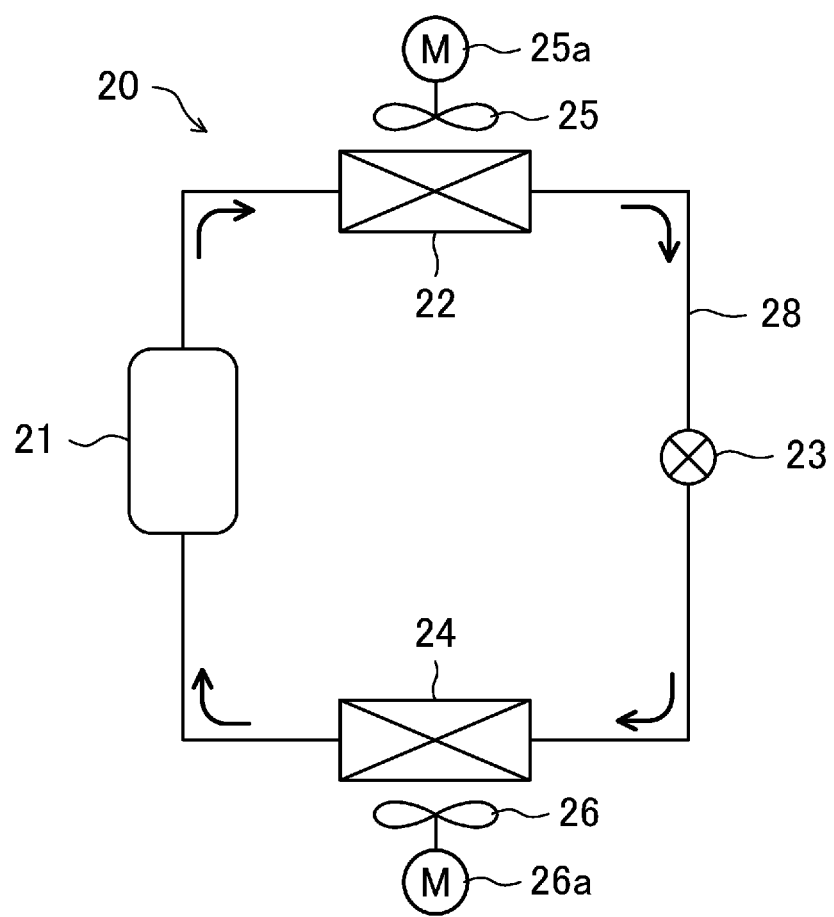
FIG. 3 is a piping diagram illustrating a configuration of a refrigerant circuit.
Figure 4:
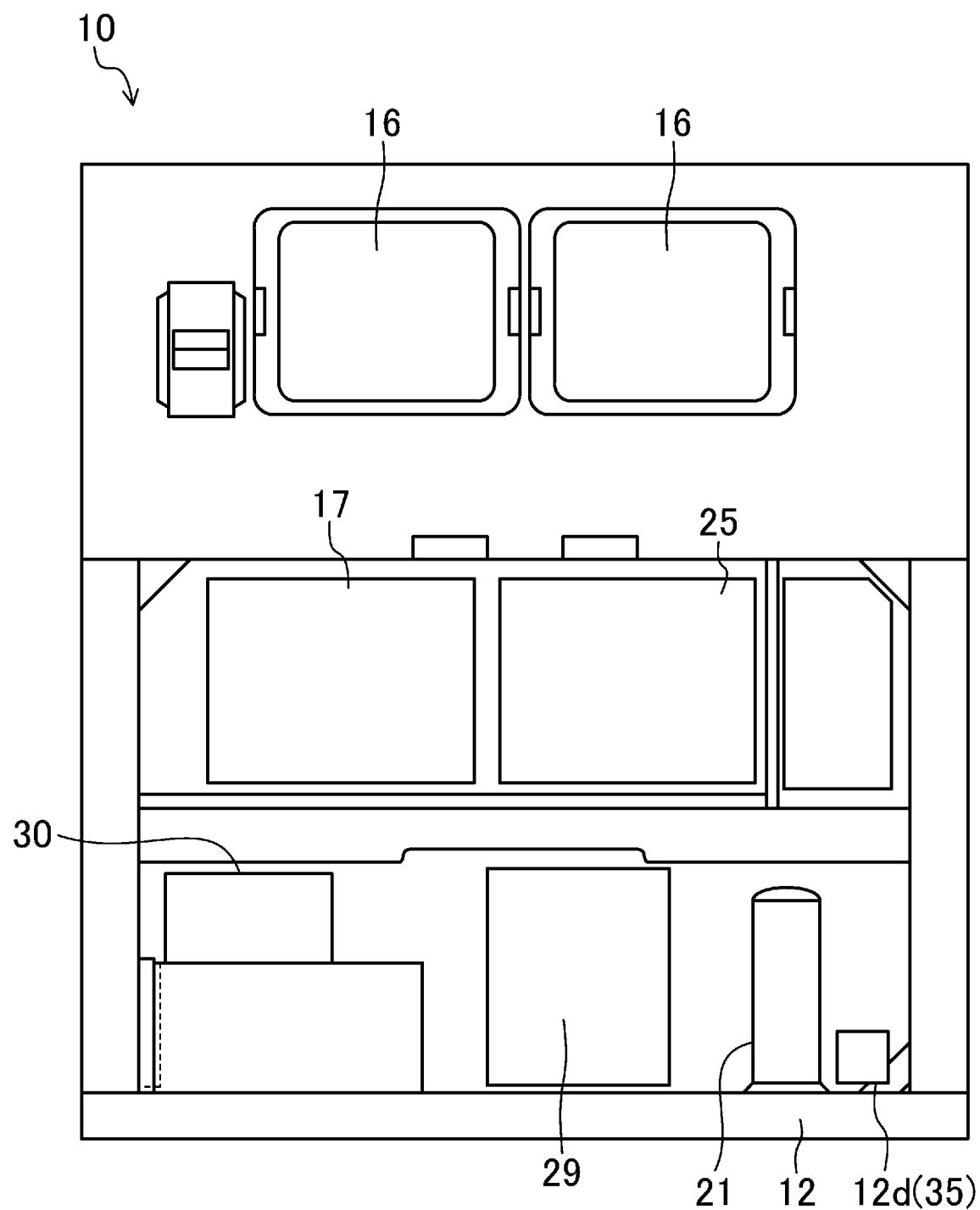
FIG. 4 is a front view of the container refrigerator.

As shown in FIG. 3, the container refrigerator (10) is provided with a refrigerant circuit (20), in which refrigerant is circulated so that a vapor compression refrigeration cycle is carried out. The refrigerant circuit (20) includes a compressor (21), a condenser (22), an expansion valve (23) and an evaporator (24) which are connected in series with a refrigerant pipe (28).

As shown in FIG. 1 and FIG. 2, the compressor (21) and the condenser (external heat exchanger) (22) are housed in the external storage space (S1). An external fan (25) is disposed above the condenser (22). The external fan (25) is driven in rotation by an external fan motor (25a) and guides air found outside of the container main body (11) into the external storage space (S1) and sends it to the condenser (22). In the condenser (22), heat is exchanged between a refrigerant flowing inside the condenser (22) and outside air.

Figure 5:
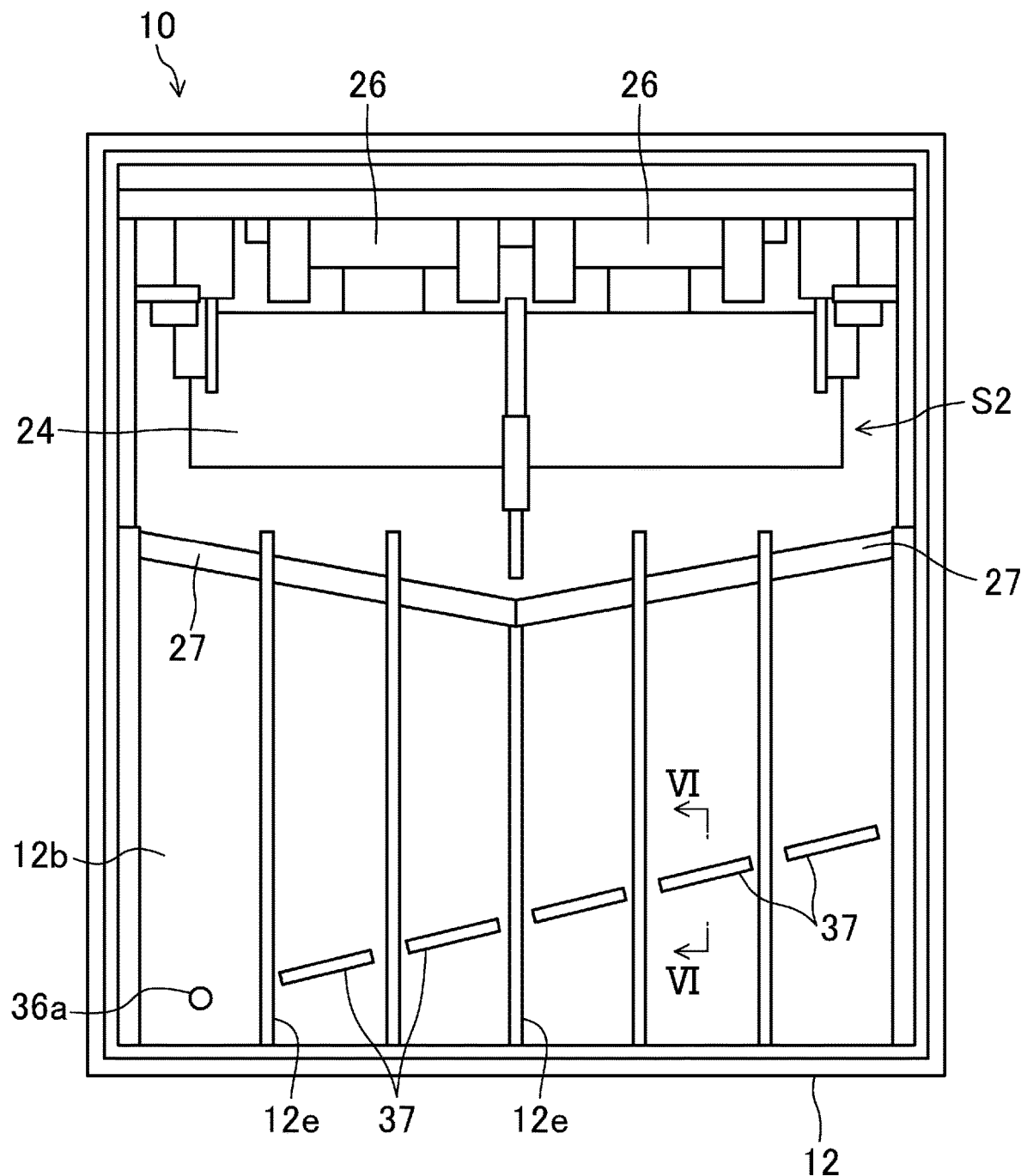
FIG. 5 is a back view of the container refrigerator.

The evaporator (24) is stored in the internal storage space (S2). As shown in FIG. 5, two internal fans (26) adjacent to each other in a width direction of the casing (12) are disposed above the evaporator (24) in the internal storage space (S2). A drain pan (27) receiving drain water generated in the evaporator (24) is provided in the bottom part of the internal storage space (S2), as shown in FIG. 5. The drain pan (27) has an inclined surface whose height decreases in the direction from either end of the casing (12) toward the center of the casing (12).

The internal fan (26) is driven in rotation by an internal fan motor (26a), guides internal air of the container main body (11) from the intake port (18a), and blows the air to the evaporator (24). In the evaporator (24), heat is exchanged between a refrigerant flowing inside the evaporator (24) and internal air. Internal air cooled through heat discharge to refrigerant at the time of passing through the evaporator (24) passes through the air flow path (19a) and is blown from the outlet (18b) into the cargo storage space (S3) of the container main body (11).

The container refrigerator (10) includes a mixed gas supply device (30) which supplies mixed gas with a low oxygen concentration to the cargo storage space (S3) of the container main body (11) to adjust oxygen concentration in the internal spaces (S2, S3). The mixed gas supply device (30) is unitized and disposed at the lower left corner of the external storage space (S1), as shown in FIG. 1. On the right side of the mixed gas supply device (30), there is disposed an inverter box (29) which houses a driver circuit driving the compressor (21) at a variable velocity.

The container refrigerator (10) includes a sensor for refrigerant leakage detection (35) detecting refrigerant leakage from the refrigerant circuit (20). The sensor for refrigerant leakage detection (35) is disposed outside of the internal spaces (S2, S3) of the container main body (11). Specifically, the above sensor for refrigerant leakage detection (35) is disposed at least partially outside of the storage box with respect to the thermal insulator (12c) disposed in the casing (12). In other words, the sensor for refrigerant leakage detection (35) is disposed between the interior wall (12b) and the exterior wall (12a). The thermal insulator (12c) is disposed between the refrigerant detection sensor (35) and the interior wall (12b) (at the side of the internal spaces (S2, S3) facing the sensor for refrigerant leakage detection (35)). A door (12d) for maintenance of the sensor for refrigerant leakage detection (35) is provided on the exterior wall (12a). Further, the sensor for refrigerant leakage detection (35) may be disposed in the external storage space (S1), as indicated by an imaginary outline in FIG. 2.

Between the interior wall (12b) and the exterior wall (12a), there is provided an air tube serving as an internal air guide passage (36) guiding internal air from the discharge side of the internal fan (26) disposed in the internal storage space (S2) of the container main body (11) to the sensor for refrigerant leakage detection (35). An air-inlet side end (36a) of the internal air guide passage (36) is disposed on the discharge side of the internal fan (26) and an air-outlet side end (36b) of the internal air guide passage (36) is disposed at the intake side of the internal fan (26). The air-inlet side end (36a) of the internal air guide passage (36) is disposed downstream of airflow of the evaporator (24), that is, below the evaporator (24) viewed in a height direction.

Figure 6:
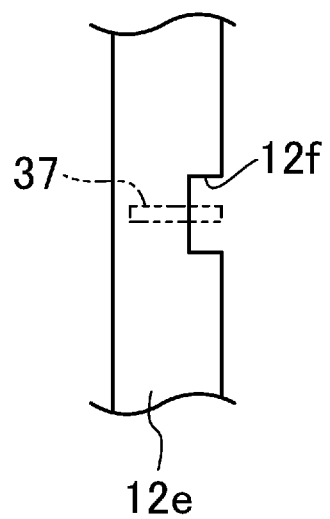
FIG. 6 is a cross-sectional view taken along line VI-VI shown in FIG. 5.

The interior wall (12b) of the casing (12) is provided with a plurality of plates (ribs) (12e) extending in a vertical direction. The interior wall (12b) is provided with a guide member (37), which is disposed between the plates (12e) and guides air flowing through the cargo storage space (S3) of the container main body (11) into the internal air guide passage (36). In other words, this guide member (37) is disposed at the side of the internal wall (12b) facing the cargo storage space (S3) in the container main body (11). Each plate (37) has an opening (120 through which air flowing along the guide member (37) passes, as shown in FIG. 6.

Operation

During operation of the container refrigerator (10) of this embodiment, the compressor (21) of the refrigerant circuit (20) is started so that the refrigeration cycle is performed in the refrigerant circuit (20). Air in the internal storage space (S2, S3) is circulated between the cargo storage space (S3) and the internal storage space (S2) by the internal fan (26), and is cooled while passing through the evaporator (24) due to heat absorption by the refrigerant. The refrigerant circulates in the refrigerant circuit (20), absorbs heat in the evaporator (24) from internal air, and evaporates; whereas, the refrigerant repeats the cycle of discharging heat to external air and condensing in the condenser (22).

The internal air flowing in the internal storage space (S2) flows partially from the air-inlet side end (36a) into the internal air guide passage (36). The internal air flowing into the internal air guide passage (36) passes through the sensor for refrigerant leakage detection (35) and then flows out from the air-outlet side end (36b), returning to the internal storage space (S2). Since internal air passes through the sensor for refrigerant leakage detection (35), refrigerant leakage is detected by the sensor for refrigerant leakage detection (35) in case where the refrigerant leaks out from the refrigerant circuit.

The above sensor for refrigerant leakage detection (35) is disposed at the position distant from the internal spaces (S2, S3) with the thermal insulator (12c) interposed therebetween. As a result, the sensor for refrigerant leakage detection (35) is less likely to be affected by the temperature in the internal spaces (S2, S3). Hence, the sensor for refrigerant leakage detection (35) is less subject to dew condensation even in case of low temperature in the internal spaces (S2, S3).

Advantages of Embodiment

According to this embodiment, the sensor for refrigerant leakage detection (35) is disposed outside of the internal spaces (S2, S3) and the thermal insulator (12c) is interposed between the sensor for refrigerant leakage detection (35) and the internal spaces (S2, S3). Therefore, refrigerant leakage can be detected without taking any measure of heating up the sensor for refrigerant leakage detection (35) even in case of low temperature. Therefore, dew condensation of the sensor for refrigerant leakage detection (35) can be prevented, resulting in prevention of breakdown of the sensor for refrigerant leakage detection (35).

According to this embodiment, the sensor for refrigerant leakage detection (35) is disposed not inside, but outside of, the internal spaces (S2, S3). Therefore, the sensor for refrigerant leakage detection (35) may be replaced or repaired in case of breakdown. In particular, according to this embodiment, the door (12d) for maintenance is provided in the casing (12) so that the maintenance of the sensor for refrigerant leakage detection (35) can easily be carried out. Conventionally, with the sensor for refrigerant leakage detection broken down, cargoes have to be transported while the situation inside the container main body (11) is unclear. As a result, at the time of unloading cargoes upon arrival, the measure to prevent the combustible refrigerant from flowing out from the internal spaces (S2, S3) of the container main body (11) to the outside irrespective of the existence of refrigerant leakage is required. On the other hand, according to this embodiment, the situation inside the container main body (11) can be clearly understood, eliminating the unnecessary countermeasure to refrigerant leakage at the time of unloading cargoes.

According to this embodiment, the air-inlet side end (36a) of the internal air guide passage (36) is disposed at the discharge side of the internal fan (26). This air-inlet side end (36a) of the internal air guide passage (36) is disposed downstream in the flow direction of internal air with respect to the evaporator (24), that is, below the evaporator (24) in a height direction. As a result, it is ensured that internal air partially passes through the sensor for refrigerant leakage detection (35). Therefore, the detection accuracy can be enhanced. The guide member (37) is disposed, in the casing (12), facing the internal spaces (S2, S3) and guides internal air into the air-inlet side end (36a) of the internal air guide passage (36), which also leads to the enhancement of the detection accuracy of the refrigerant detection leakage sensor (35).

VARIATIONS OF EMBODIMENT

First Variation

Figure 7:
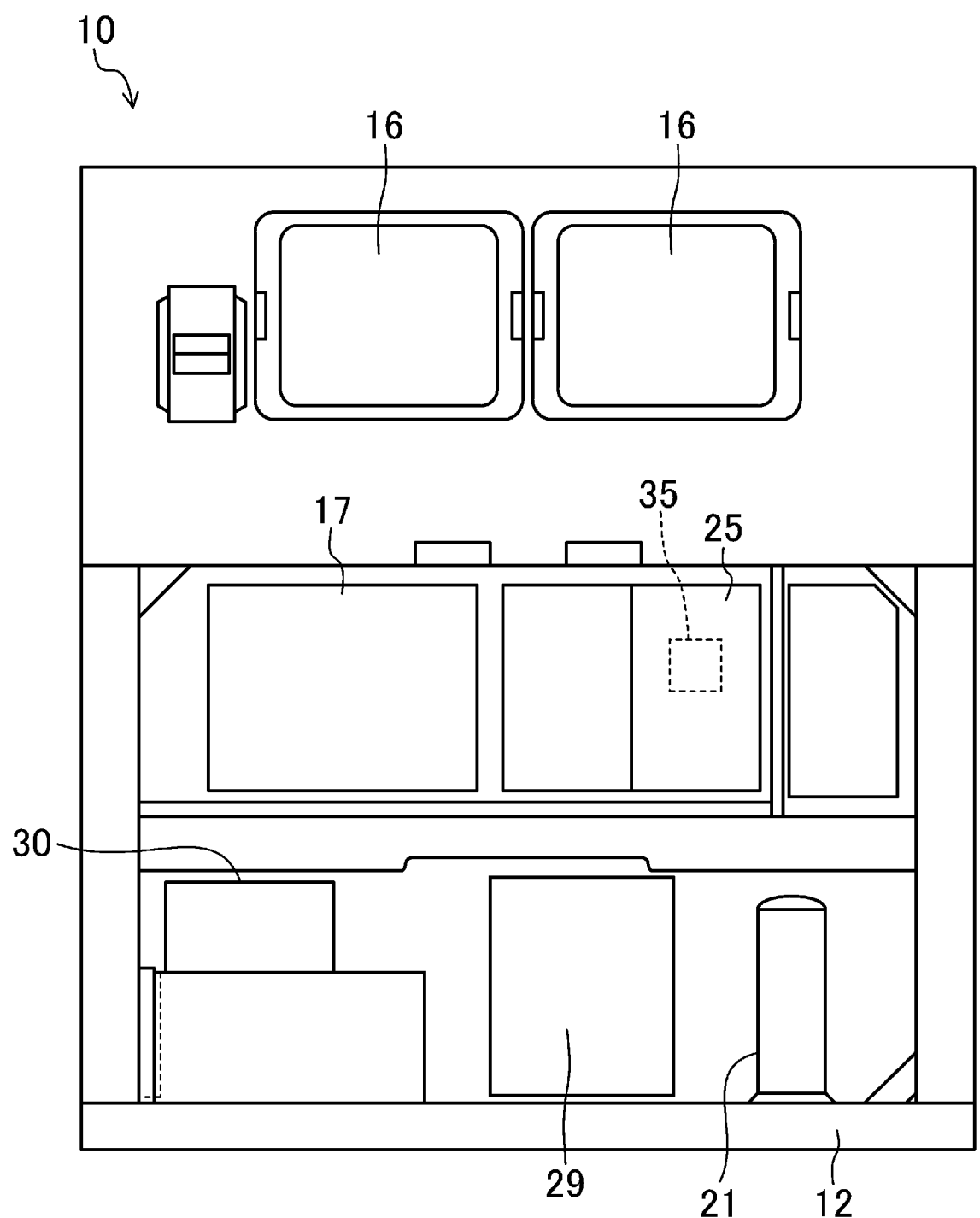
FIG. 7 is a front view of a container refrigerator according to a first variation of the embodiment.
Figure 8:
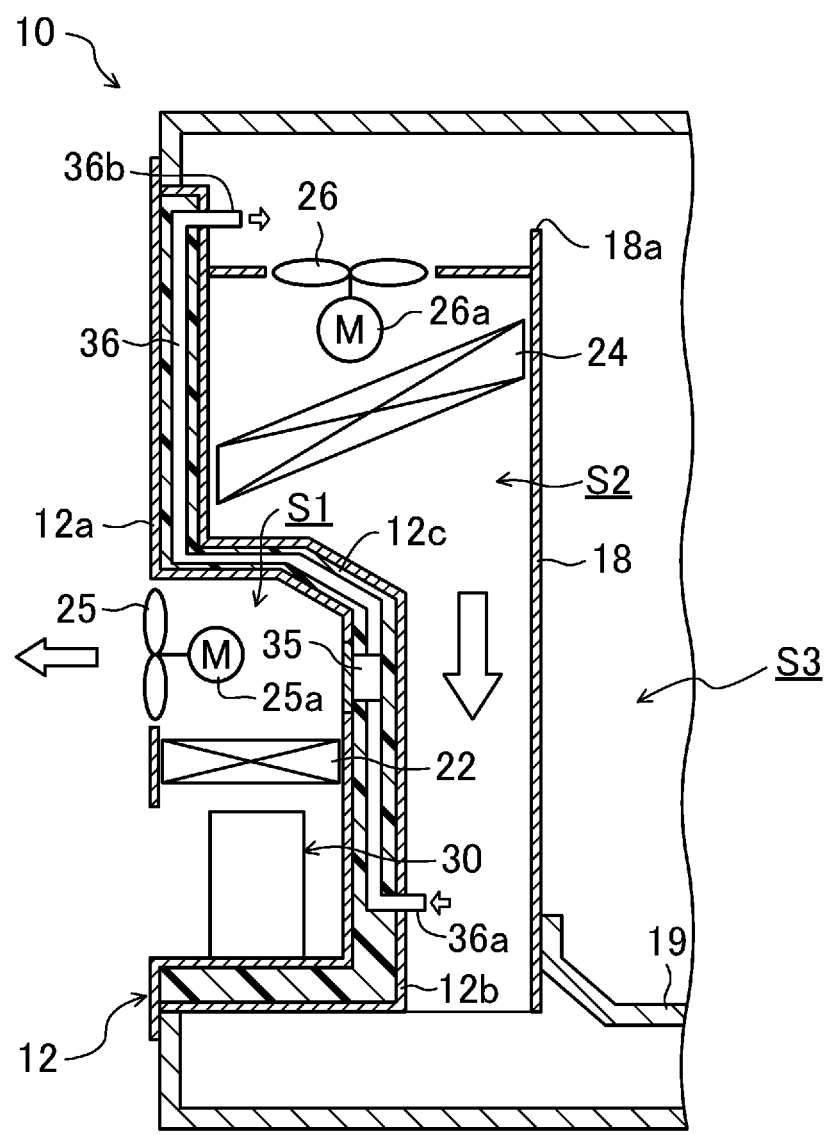
FIG. 8 is a lateral cross-sectional view of the container refrigerator according to the first variation of the embodiment.

FIG. 7 and FIG. 8 show a first variation of the embodiment. This first variation is an example in which the position of the sensor for refrigerant leakage detection (35) is different from that of the embodiment shown in FIG. 1 to FIG. 6.

In this first variation, the sensor for refrigerant leakage detection (35) is disposed at a position behind the external fan (25) shown in FIG. 7. Except for this point, the configuration of this variation is similar to that of the above embodiment, including the structure where the sensor for refrigerant leakage detection (35) is disposed between the exterior wall (12a) and the interior wall (12b) of the casing (12).

Also in this first variation, air can be surely guided from the internal spaces (S2, S3) to the sensor for refrigerant leakage detection (35), as in the case of the embodiment shown in FIG. 1 to FIG. 6. As a result, refrigerant leakage can be detected with high accuracy, eliminating the unnecessary countermeasure to refrigerant leakage at the time of unloading cargoes. Further, the sensor for refrigerant leakage detection (35) is less likely to be affected by the temperature in the internal spaces (S2, S3) and thus less subject to dew condensation. This almost saves the need for the countermeasure to the breakdown of the sensor for refrigerant leakage detection (35) and facilitates the replacement or repair in case of breakdown.

Second Variation

Figure 9:
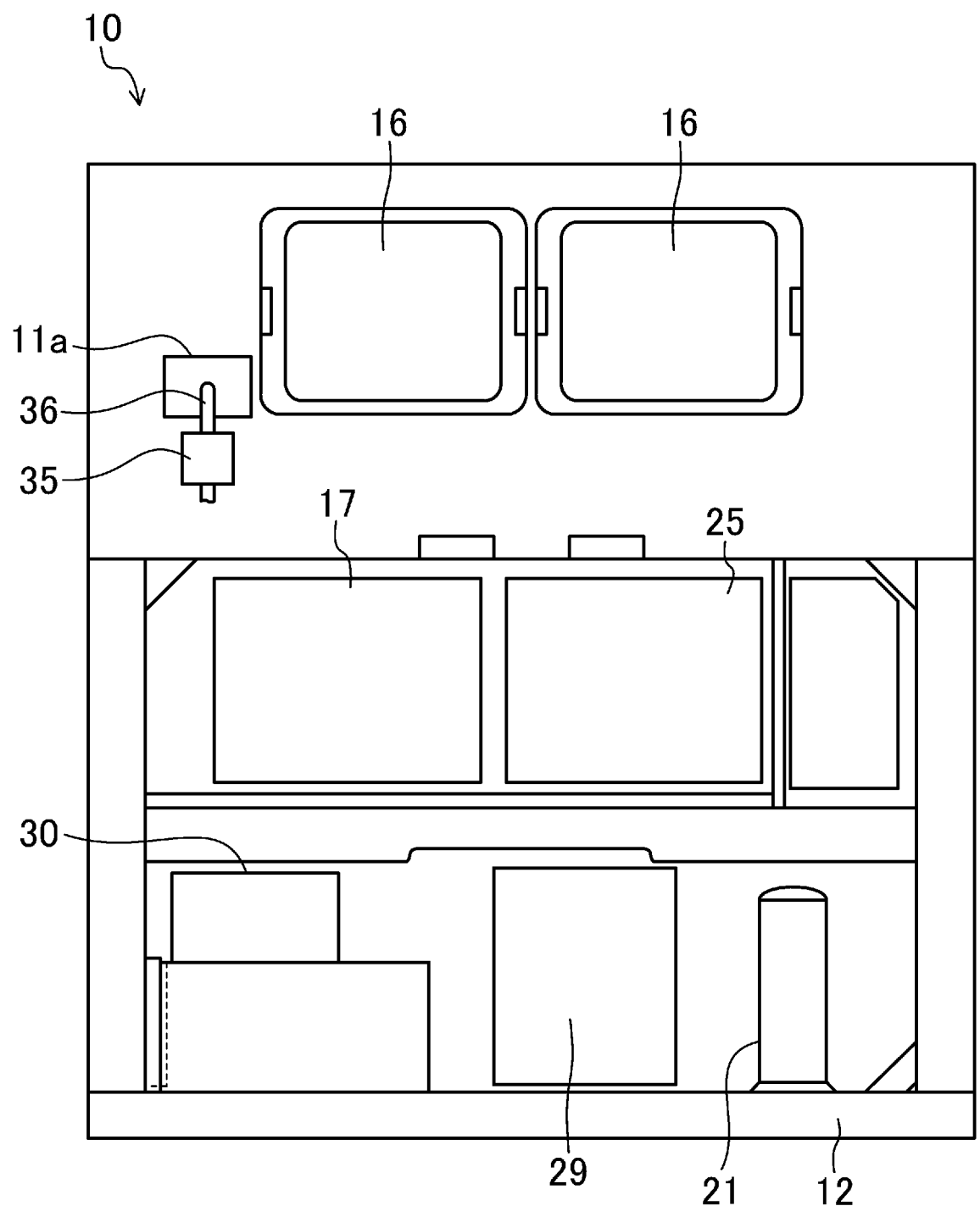
FIG. 9 is a front view of a container refrigerator according to a second variation of the embodiment.
Figure 10:
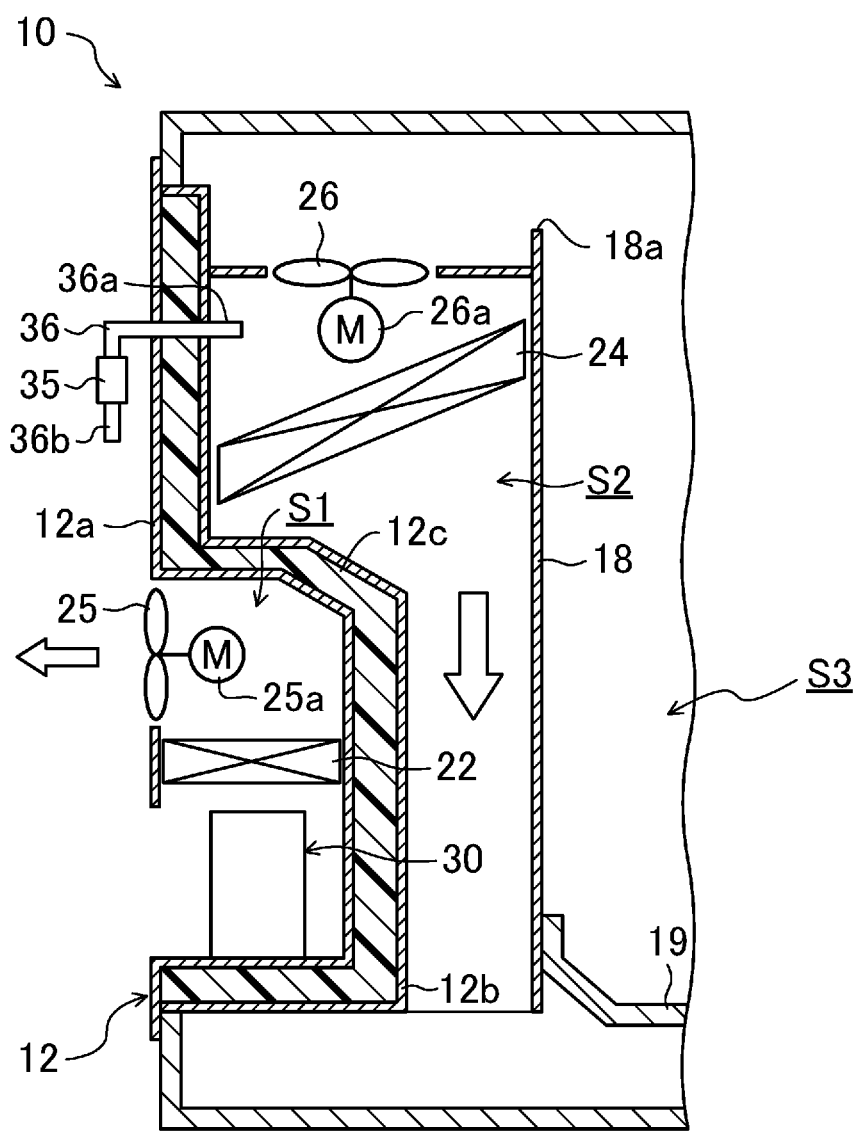
FIG. 10 is a lateral cross-sectional view of the container refrigerator according to the second variation of the embodiment.

FIG. 9 and FIG. 10 show a second variation of the embodiment. This second variation is an example in which the position of the sensor for refrigerant leakage detection (35) is different from that of the embodiment shown in FIG. 1 to FIG. 6 as well as that of the first variation shown in FIG. 7 and FIG. 8.

In this second variation, the sensor for refrigerant leakage detection (35) is disposed in the vicinity of the outlet of a ventilation port (11a) disposed in the casing (12) of the container main body (11). Further, the sensor for refrigerant leakage detection (35) is disposed outside the casing (12). An air-inlet side end (36a) for internal air of the internal air guide passage (36) is disposed inside the ventilation port (11a) and the air-outlet side end (36b) is disposed below the sensor for refrigerant leakage detection (35).

Also with this configuration, air can be surely guided from the internal spaces (S2, S3) to the sensor for refrigerant leakage detection (35). As a result, refrigerant leakage can be detected, eliminating the unnecessary countermeasure to refrigerant leakage at the time of unloading cargoes. Further, the sensor for refrigerant leakage detection (35) is less likely to be affected by the temperature in the internal spaces (S2, S3) and thus less subject to dew condensation. This almost saves the need for the countermeasure to the breakdown of the sensor for refrigerant leakage detection (35) and facilitates the replacement or repair in case of breakdown. Further, in this configuration of the second variation, the sensor for refrigerant leakage detection (35) can be easily disposed. It is also possible to retrofit the sensor for refrigerant leakage detection (35) to the container refrigerator (10).

Third Variation

The sensor for refrigerant leakage detection (35) may be disposed at a position indicated by the imaginary outline of FIG. 2. In this third variation, the sensor for refrigerant leakage detection (35) is disposed inside the external storage space (S1) of the casing (12) and downstream of the air flow in the condenser (22). The position of the air tube, that is, the internal air guide passage (36) may appropriately be positioned in accordance with the position of the sensor for refrigerant leakage detection (35).

With this configuration, warm air after passing through the condenser (22) passes through the sensor for refrigerant leakage detection (35). As a result, the sensor for refrigerant leakage detection (35) is less subject to dew condensation than in the above embodiment or the variations. Furthermore, the measure to the breakdown of the sensor for refrigerant leakage detection (35) can easily be taken, eliminating the unnecessary countermeasure to refrigerant leakage at the time of unloading cargoes.

Other Embodiments

The above-described embodiment may be modified as follows.

In the above embodiment or the variations, the sensor for refrigerant leakage detection (35) is disposed between the exterior wall (12a) and the interior wall (12b), in the external storage space (S1), or bellow the ventilation port (11a) of the casing (12). The position of the sensor for refrigerant leakage detection (35) may be appropriately changed as long as it is disposed outside the internal spaces (S2, S3) of the container main body (11) and internal air can be guided through the internal air guide passage (36).

Further, according to the embodiment, the container refrigerator (10) cooling the inside of the container main body (11) is described. This disclosure is not limited to the container refrigerator (10) used for marine transportation or land transportation, but applicable for a refrigerator adjusting the temperature and the humidity in the internal spaces of various storage boxes including land-based warehouses storing various goods.

INDUSTRIAL APPLICABILITY

As described above, this disclosure is useful for the refrigerator provided with the sensor for refrigerant leakage detection detecting refrigerant leakage in the refrigerant circuit.

DESCRIPTION OF REFERENCE CHARACTERS

10 Container Refrigerator (Refrigerator)
11 Container Main Body (Storage Box)
11a Ventilation Port
12 Casing
12c Thermal Insulator
20 Refrigerant Circuit
22 Condenser 24 Evaporator
26 Internal Fan (Fan)
35 Sensor for Refrigerant Leakage Detection
36 Internal Air Guide Passage
36a Air-inlet Side End
36b Air-outlet Side End
37 Guide Member

The invention claimed is:

1. A refrigerator, comprising a casing mounted to a storage box, a refrigerant circuit including an evaporator cooling internal air in the storage box and a condenser disposed outside the storage box, and a sensor for refrigerant leakage detection detecting a leakage of a refrigerant from the refrigerant circuit, the sensor for refrigerant leakage detection being disposed outside of an internal space of the storage box, and an internal air guide passage guiding the internal air from a discharge side of a fan disposed in the internal space of the storage box to the sensor for refrigerant leakage detection,
   wherein an air-inlet side end of the internal air guide passage is disposed at a discharge side of the fan and an air-outlet side end of the internal air guide passage is disposed at an intake side of the fan.

2. The refrigerator of claim 1, wherein the sensor for refrigerant leakage detection is disposed at least partially outside of the storage box with respect to a thermal insulator disposed in the casing.

3. The refrigerator of claim 2, wherein an air-inlet side end of the internal air guide passage is disposed at a discharge side of the fan and an air-outlet side end of the internal air guide passage is disposed at an intake side of the fan.

4. The refrigerator of claim 2, wherein the air-inlet side end of the internal air guide passage is disposed downstream of airflow passing through the evaporator.

5. The refrigerator of claim 4, wherein the air-inlet side end of the internal air guide passage is disposed below the evaporator.

6. The refrigerator of claim 2, wherein an interior wall of the casing guides air flowing in the internal space of the storage box into the internal air guide passage.

7. The refrigerator of claim 2, wherein the sensor for refrigerant leakage detection is disposed downstream of airflow passing through the condenser.

8. The refrigerator of claim 2, wherein the sensor for refrigerant leakage detection is disposed in a vicinity of an outlet of a ventilation port provided in the casing of the storage box.

9. The refrigerator of claim 2, wherein the storage box is a container main body used for transportation of a cargo, and the casing is configured to be mounted to the container main body.

10. The refrigerator of claim 1, wherein the air-inlet side end of the internal air guide passage is disposed downstream of airflow passing through the evaporator.

11. The refrigerator of claim 10, wherein the air-inlet side end of the internal air guide passage is disposed below the evaporator.

12. The refrigerator of claim 1, wherein an interior wall of the casing guides air flowing in the internal space of the storage box into the internal air guide passage.

13. The refrigerator of claim 1, wherein the sensor for refrigerant leakage detection is disposed downstream of airflow passing through the condenser.

14. The refrigerator of claim 1, wherein the sensor for refrigerant leakage detection is disposed in a vicinity of an outlet of a ventilation port provided in the casing of the storage box.

15. The refrigerator of claim 1, wherein the storage box is a container main body used for transportation of a cargo, and the casing is configured to be mounted to the container main body.

* * * * *